July 15, 1941.  H. C. DOANE ET AL  2,249,120
DIRECTION SIGNAL OPERATING MEANS
Filed Dec. 7, 1939  3 Sheets-Sheet 1
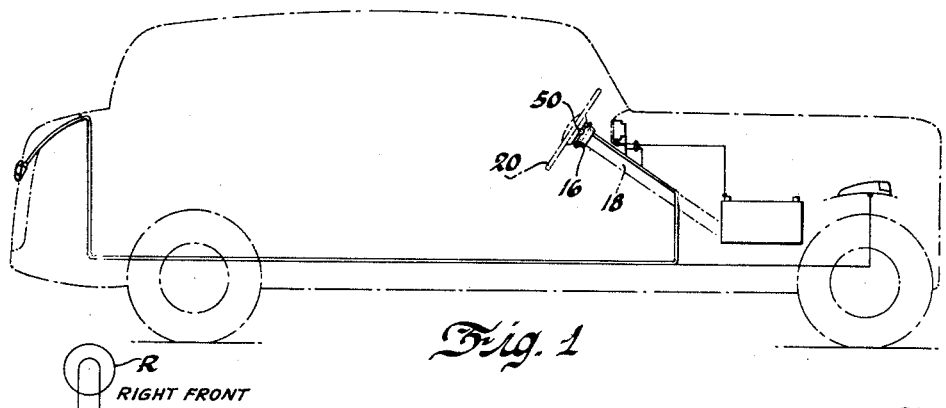
Fig. 1
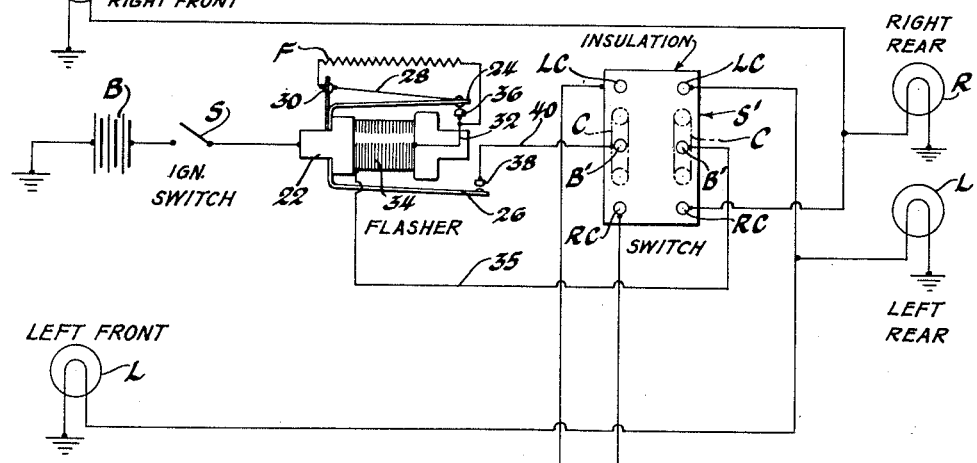
Fig. 2
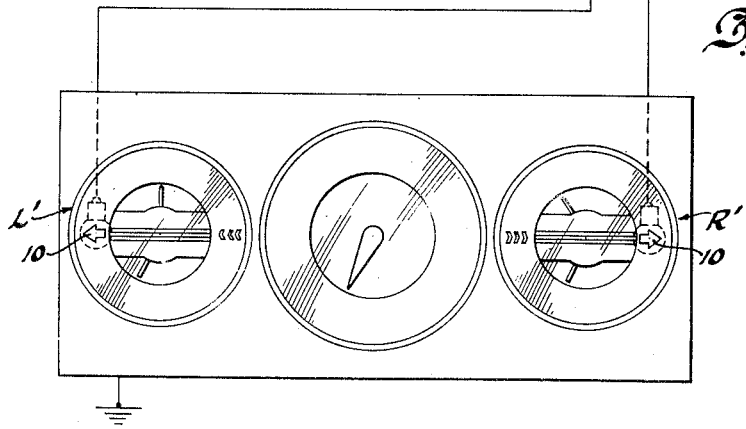
Inventors
Harry C. Doane &
Albert G. Vosburgh
By
Blackmore, Spencer & Flint
Attorneys

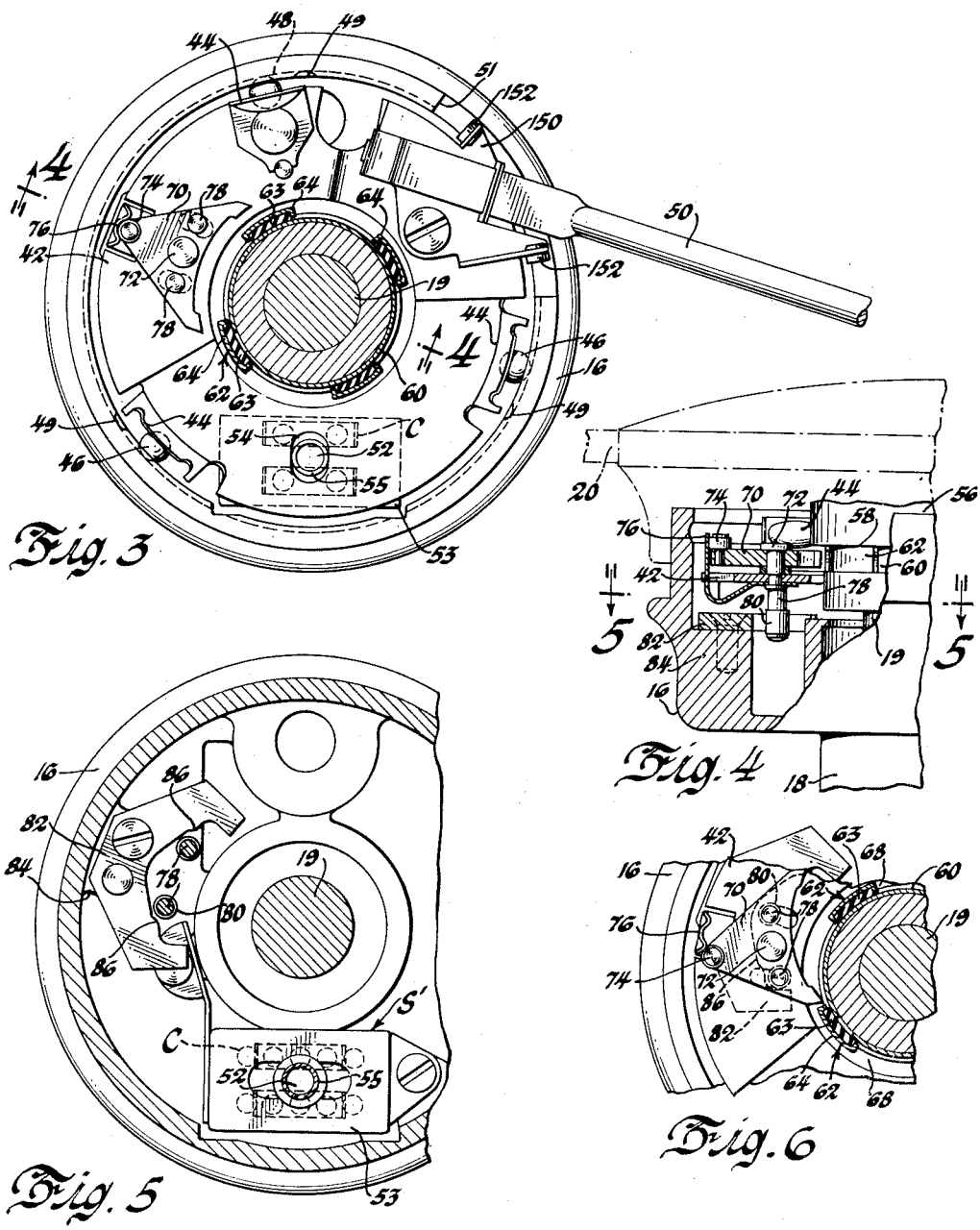

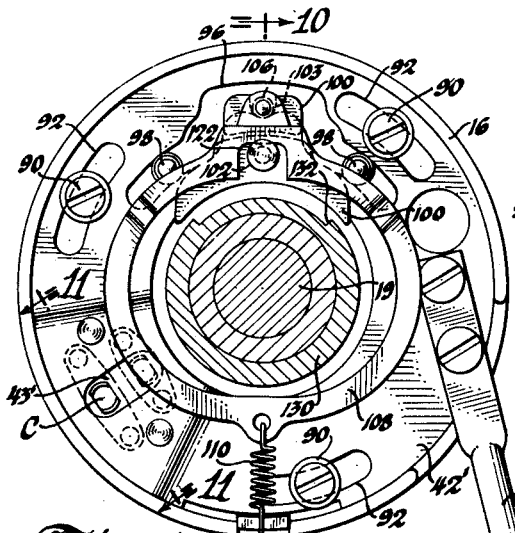
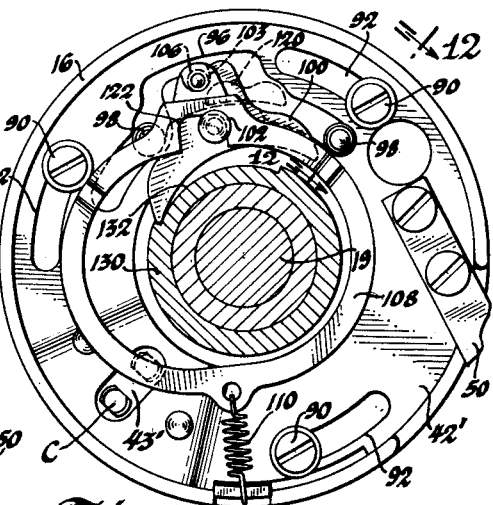
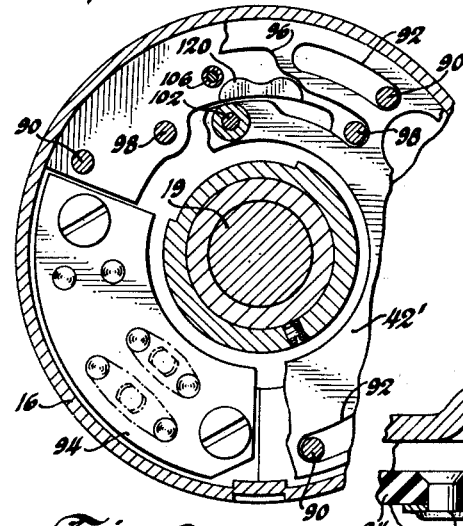
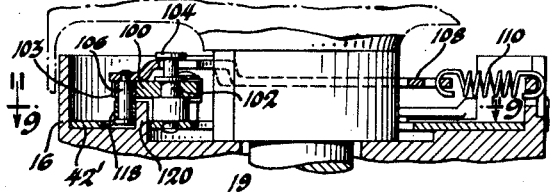
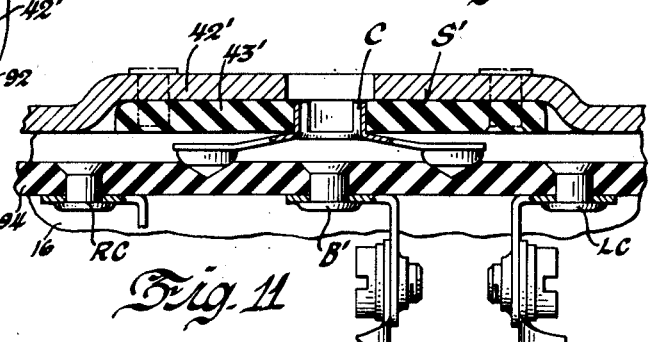
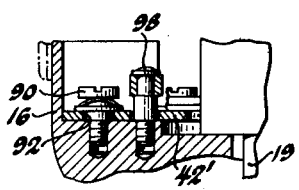

Patented July 15, 1941

2,249,120

UNITED STATES PATENT OFFICE 2,249,120

DIRECTION SIGNAL OPERATING MEANS

Harry C. Doane and Albert G. Vosburgh, Flint, Mich., assignors to General Motors Corporation, Detroit, Mich., a corporation of Delaware Application December 7, 1939, Serial No. 308,033

12 Claims. (Cl. 200—59)

This invention has to do with operating mechanism for use in direction signaling systems for vehicles. The improved operating mechanism is preferably associated with the steering mechanism so that when the switch is moved to indicating position it is unaffected by further rotation of the steering wheel in the direction of the turn but when the direction of turn is reversed to restore the vehicle to straight ahead travel, the switch and its operating mechanism are automatically returned to off position. This is preferably accomplished in such a way that should there be any breakdown in the switch operating mechanism or in the switch there will be no interference with the steering of the vehicle.

The operating mechanism is preferably designed so as to be mounted in the housing for the steering column convenient to the driver. It is also marked by simplicity and sturdiness of construction. Other features and advantages of the invention will be pointed out in the course of the specification.

Figure 1 is a diagrammatic view showing the use of the direction signal operating means on a conventional automobile.

Figure 2 shows diagrammatically the direction signal circuit.

Figure 3 is a top plan view of the direction signal operating mechanism.

Figure 4 is a section on line 4—4 of Figure 3.

Figure 5 is a fragmentary section on line 5—5 of Figure 4.

Figure 6 is a fragmentary view of a portion of the showing of Figure 3 but with parts in a different position.

Figures 7 and 8 are top plan views of a modified form of direction signal operating mechanism showing the parts in different positions which they assume during operation.

Figure 9 is a section on line 9—9 of Figure 10.

Figure 10 is a section on line 10—10 of Figure 7.

Figure 11 is a fragmentary section on line 11—11 of Figure 7.

Figure 12 is a section on line 12—12 of Figure 8.

There is illustrated in Figure 2 a preferred form of direction signal circuit with which the present invention is employed. Current is supplied from battery B through the usual ignition switch S; then through the flasher F and switch S' either to the right front and right rear direction signals R and the right pilot lamp R' or to the left front and left rear direction signals L and the left pilot light L'. Switch S' comprises two simultaneously movable bridging contacts C shown in off position but adapted to be moved to one side or the other to engage either the right hand contacts RC or the left hand contacts LC and supply them with current from battery contacts B'. The flasher F supplies interrupted current to the direction signals and to the pilot lamps.

In Figure 2 the pilot lamps R', L' are illustrated as illuminating transparent arrow-shaped pointers 10 suitably incorporated in the instrument board.

Flasher F consists of a metal frame 22 carrying armatures 24 and 26. Armature 24 is normally held away from contact 36 by means of resistance wire 28 anchored in insulator 30 and connected to insulated lead 32 in series with solenoid 34 the other end of which is connected by lead 35 to right hand contact B', shown in Figure 2, which supplies current to the direction signals. Lead 32 is connected to stationary contact 36 which is adaped to engage a contact carried by armature 24 as shown. Armature 26 carries a suitable contact adapted to engage stationary contact 38 connected by lead 40 to left hand contact B' which supplies current to the pilot lamps.

The circuit operates as follows: With ignition switch S closed and switch S' operated to cause movable contacts C to bridge fixed contacts B' and RC to indicate a right turn, current flows from the battery B through frame 22 to armature 24, resistance 28, insulated lead 32, solenoid 34, lead 35, fixed contact B', movable contact C, fixed contact RC to the right direction signals. However the resistance of wire 28 is so great that there is not sufficient flow of current to light the signals. The current that does flow is, however, sufficient to heat wire 28 and cause it to expand so that armature 24 engages contact 36, thereby shortcircuiting resistance 28 and permitting sufficient current to flow to cause the right direction signals to burn brightly. At the same time the increased flow of current causes solenoid 34 to attract armature 26, thereby permitting current to flow from the battery through frame 22, armature 26, fixed contact 38, lead 40, left hand contact B', movable switch contact C, fixed contact RC to the right pilot lamp R'. Short-circuited resistance 28 now cools off and contracts thereby breaking the contact of armature 24 with fixed contact 36 thereby restoring the circuit to its original condition in which both the signals and pilots are out. This cycle of operations is repeated as long as the signaling circuit is closed thereby flashing both signal lamps and the pilot lamp on the side selected.

One advantage of this circuit is the fact that should either or both of the direction signals on the side toward which a turn is being signaled, fail to operate, the corresponding pilot lamp R' or L' will not flash for the current flowing in the circuit will be insufficient to cause magnet 34 to attract its armature 26.

In Figure 1 the direction signal system is shown as it is used on an automobile. The rear direction signals are preferably grouped together, preferably on the door of the luggage compartment while the front direction signals are mounted on the fenders as shown. The flasher F is mounted on the rear of the dash and the switch S' is housed within an enlarged upper portion 16 of the steering shaft housing 18, the shaft 19 within the housing being provided with the usual steering wheel shown at 20.

The present invention has to do principally with the means for operating the direction signal switch S' so as to cause either the left or right direction signals to go on and to cause the switch to be automatically returned to off position when the direction of rotation of the steering wheel is reversed after the turn to cause the vehicle to resume a straight course.

Referring first to the form of the invention shown in Figures 3 to 6, 16 indicates the enlarged upper portion of the steering shaft housing in which is rotatably mounted an annular member 42. To reduce friction, portions 44 of the edge of the annular member are formed to receive and guide bearing balls 46 adapted to run in arcuate slots 48 formed in the interior of the housing. Filling grooves 49 may be provided as shown for convenience in inserting the balls.

50 indicates an operating handle suitably secured to stamping 150 fixed to the operating member 42. As shown in Figure 1 the handle 50 projects to a point preferably near the periphery of the steering wheel for the convenience of the operator. The stamping 150 is preferably provided with pads 152 of rubber or other cushioning material to deaden any noise which might be produced by engagement of operating handle 50 or the parts to which it is connected with the ends of slot 51 provided in the upper end of housing enlargement 16 through which handle 50 passes.

Annular member 42 serves to operate switch S' which controls the direction signals and pilots. Switch S' may be a simple double throw sliding switch preferably equipped with ball bearings to reduce friction to a minimum. The switch has a stud 52 projecting upwardly from the sliding portion of the switch carrying movable contacts C and housed within and guided by the housing 53 which may be suitably secured in the upper end of the enlargement 16 as shown in Figure 5. Obviously by shifting the movable switch member to one side or the other of the position shown in Figure 5 contacts C may, as indicated in Figure 2, be arranged to supply current from battery terminals B' to either the left direction signal contacts LC or the right direction signal contacts RC. Annular member 42 is provided with slot 54 engaging over the stud 52 which may, if desired, be provided with a roller 55. By this means rotation of the annular member 42 effects movement of the switch. Attention is called to the fact that the movable contacts C engage contacts B' and LC or RC under tension so that the switch serves as a detent tending to hold the parts in either on or off position.

The resetting mechanism for the switch operating means will now be described. 56 indicates a portion of the hub of the steering wheel 20 provided with a grooved or reduced portion 58 about which is snapped a friction ring 60 to which are secured spaced lugs 62 preferably consisting of strips or blocks of rubber 63 provided with sheet metal caps 64. The rubber blocks are vulcanized to both the ring 60 and the caps 64. Any desired number of lugs may be provided. Preferably one of the lugs overlaps the split 66 between the ends of the ring 60. By the described arrangement notches 68 are formed between the lugs for the purpose now to be described.

70 indicates a triangularly shaped pawl pivoted at 72 to annular member 42. On the outer end of the pawl is mounted roller 74 engaging spring detent 76 having its lower end secured to the plate 42 as by connection with the lower end of pivot 72 as shown in Figure 4. Spring detent 76 is shaped so as to hold the pawl 70 either in the position shown in Figure 3 or in the position shown in Figure 6, and owing to its spring action to snap the pawl into either its tilted position or its central position as these positions are approached. Depending from pawl 70 are pins 78 carrying at their bottoms rollers 80 adapted to engage fixed cam 82 secured on a shoulder 84 provided within the enlargement 16 as best shown in Figures 4 and 5. The arrangement operates as follows.

Assuming that annular member 42 is moved by handle 50 in counterclockwise direction to operate switch S' to indicate a left turn, the lower stud 78 is caused to engage shoulder 86 on cam 82 thereby causing the pawl 70 to tilt to the position shown in Figure 6 with one end in engagement with the notches 68 or the lugs 62 depending upon the position of the steering shaft. The pawl is yielding held in this position by spring detent 76 so that rotation of the steering shaft in counterclockwise direction to effect the turn does nothing but tilt the pawl 70 on its axis 72 against the resistance of spring detent 76. It will be noted that this movement of the pawl is permitted by the clearance between the studs 78 and the cam 82 in the position of parts shown in Figure 6.

When the turn has been completed and the steering shaft is rotated in reverse direction to return the vehicle to straight ahead travel one of the lugs 62 engages one end of pawl 70 as shown in Figure 6, and carries the pawl and with it annular member 42 and the movable member of switch S' back toward the off position shown in Figure 3. During this movement upper pin 78 shown in Figure 6 engages the upper portion of cam 82, thereby rotating pawl 70 and causing it to snap into the position shown in Figure 3 in which the pawl is out of the path of movement of lugs 62. It will be noted that the yieldable construction of the lugs 62 assists in permitting the pawl and lugs to become disengaged.

One of the important advantages of the construction described is the fact that should something happen to the direction signal operating mechanism so as to lock the pawl 70 in engagement with the lugs 62 there will be no interference with steering for the result of steering would simply be to cause the snap ring 60 to slide or the steering shaft.

In the modification shown in Figures 7 to 12 the annular member 42' is provided with an operating handle 50 as previously described, but instead of having a ball bearing mounting the member 42' is guided by means of studs 90 secured to the housing 16 and passing through arcuate slots 92 in the annular member 42'. Annular member 42' carries a block 43' of insulating material on which, as shown in Figure 11, are mounted the bridging contacts C of switch S', the fixed contacts RC, B', and LC being secured to a fixed segment of insulating material 94 secured in the housing 16.

In one side of annular member 42' are formed cam slots 96 in the outer ends of which are received the roller equipped studs 98, one of which is shown in detail in Figure 12, secured to the bottom of the housing 16. 100 indicates a pawl similar to pawl 70 of the previous form of the invention, pivoted on pivot 102 secured to the annular member 42'. Pivot 102 is provided at its upper end with an overhanging flange 104. The upper end of dog 100 is notched as shown at 103 to receive roller-equipped stud 106 carried by annulus 108 surrounding the steering shaft. To the opposite side of annulus 108 is secured tension spring 110 connected to the adjacent portion of the wall of the housing 16. Stud 106 carries a second roller 118 at its lower end engaging cam 120 projecting upwardly from the bottom of the housing 16. The inner periphery of annulus 108 is notched as shown at 122 and the notched portion is received under the overhanging flange 104 of stud 102 thereby preventing upward movement of the annulus.

This form of the invention operates in much the same way as that previously described. To indicate a left turn annular member 42' is shifted from the position shown in Figure 7 to that shown in Figure 8, thereby engaging the proper contacts to indicate a left turn. Toward the beginning of the rotation of annular member 42' one end of dog 100 engages left hand fixed roller 98 causing the dog to swing in anticlockwise direction and, through engagement of its notch 103 with stud 106, lift stud 106 out of the depressed central portion of cam 120 and at the same time move the stud 106 and the annulus 108 toward the left to the position shown in Figure 8. This movement is assisted by spring 110 which owing to the relation of centers as shown in Figure 8, tends to tilt the dog 100 to the position shown. It will be noted that during the described operation the right hand stud 98 is out of engagement with its end of the pawl 100.

In this form of the invention the steering wheel or steering shaft is provided with a sleeve 130 having a notch 132 therein. While the sleeve is shown fixed to the shaft it may have a friction connection if desired. As the steering wheel is turned toward the left the direction signal operating mechanism is unaffected except that dog 100 idly engages the surface of the sleeve 130 moving in and out as the notch 132 passes under it and in doing so working against the spring 110. However, when the steering wheel is rotated in the reverse direction to restore the vehicle to straight-away travel the parts shortly assume the position shown in Figure 8 and thereafter the continued turning of the wheel in clockwise direction restores the annular member 42' with its switch contacts C and pawl 100 to the position shown in Figure 7. During the first part of this restoring movement the right hand end of pawl 100 engages right hand fixed lug 98, tilting the pawl in clockwise direction. This movement, combined with rotation of the pawl about the steering shaft axis causes notch 103 in the pawl to engage pin 106 and move it up on cam 120. When it passes over the hump of the cam, spring 110 causes it to snap into the depressed portion, this causing the pawl and ring 42' to momentarily move faster than the turning shaft and at the same time swinging the pawl out of engagement with the notch 132.

It will be apparent that the invention is susceptible of considerable modification.

In the claims the phrase "steering shaft" is used to include either the shaft alone or the shaft together with any collar, steering wheel hub or the like which is fixedly secured to it.

We claim:

1. In operating mechanism for direction signals for vehicles the combination of steering mechanism, means for operating said direction signals, restoring means associated with the steering mechanism and the operating means for restoring the operating means to off position when the steering mechanism is returned toward straightaway position after the signal has been operated, said restoring means comprising an operating member frictionally driven by the steering mechanism so as to be able to slip in case of jamming or other failure of the signal operating or restoring means so as to prevent interference with the steering mechanism.

2. In operating mechanism for direction signals for vehicles the combination of steering mechanism including a steering shaft, means for operating said direction signals including a part mounted for movement about the axis of said shaft, restoring means associated with the steering mechanism and the said part for restoring the operating means to off position when the steering mechanism is returned toward straightaway position after the signaling means has been operated, said restoring means comprising a member frictionally driven by the steering shaft so as to be able to slip in case of jamming or other failure of the signal operating or restoring means so as to prevent interference with the steering mechanism.

3. In operating mechanism for direction signals for vehicles the combination of steering mechanism including a steering shaft, means for operating said direction signals including an annular member mounted for movement about the axis of said shaft, restoring means associated with the steering mechanism and the said annular member for restoring the operating means to off position when the steering mechanism is returned toward straightaway position after the signaling means has been operated, said restoring means comprising a second annular member surrounding the steering shaft and having a notch therein, and a pawl pivoted to the first-named annular member and adapted to operatively engage the notch, said second annular member being frictionally driven by the steering shafts so as to be able to slip in case of jamming or other failure of the signal operating or restoring means so as to prevent interference with the steering mechanism.

4. In operating mechanism for direction signals for vehicles the combination of a steering shaft, an annular member mounted for rotary adjustment about the axis of said shaft, means for actuating direction signals operated by rotation of said annular member, a pawl pivoted to said annular member, means driven by said shaft adapted to be engaged by said pawl, and means operated by movement of said annular member to signal actuating position to rock said pawl into operative engagement with said last-named means so that upon reverse rotation of the shaft the annular member is rotated to off position.

5. In the combination as defined in claim 4, the means on said shaft comprising a sleeve having a notch therein to receive one end of said pawl.

6. In the combination as defined in claim 4, a friction driving connection between said means on said shaft and the shaft adapted to release to permit steering should the direction signal operating mechanism become stuck.

7. In operating mechanism for direction signals for vehicles the combination of a steering shaft, an annular member mounted for rotary adjustment about the axis of said shaft, means for actuating direction signals operated by rotation of said annular member, a double-ended pawl pivoted to said annular member, means on said shaft constructed and arranged to have operative engagement with the ends of said pawl, means yieldingly holding said pawl out of engagement with said last-named means in the off position of said annular member, and means actuated by movement of said annular member to signal actuating position to rock said pawl into operative engagement with said means so that upon reverse rotation of the shaft the annular member is rotated to off position.

8. In the combination as defined in claim 7, a friction driving connection between the means on said shaft and the shaft adapted to release to permit steering should the direction signal operating mechanism become stuck.

9. In operating mechanism for direction signals for vehicles the combination of a steering shaft, an annular member mounted for rotary adjustment about the axis of said shaft and having an off position and a turn indicating position on either side of off-position, means for actuating direction signals operated by rotation of said annular member, a double-ended pawl pivoted to said annular member, means driven by said shaft adapted to be engaged by said pawl, and means operated by movement of said annular member from off position to signal actuating position to rock said pawl so that one end or the other thereof comes into operative engagement with said last-named means so that upon reverse rotation of the shaft the annular member is rotated to off position and the pawl is restored to inoperative position.

10. In operating mechanism for direction signals for vehicles the combination of a steering shaft, a pivoted operating member associated with the shaft, means for actuating direction signals operated by movement of the pivoted member, a double-ended pawl pivoted to the pivoted operating member, and means on said shaft constructed and arranged to have ratchet engagement with one end of said pawl upon movement of said pivoted operating member to signal operating position so that upon reverse rotation of the shaft the pivoted member is rotated to off position and the pawl is restored to inoperative position.

11. In operating mechanism for direction signals the combination of a steering shaft, a pivoted operating member associated with the shaft and having an off position and a turn indicating position on either side of off position, means for actuating direction signals operated by movement of the pivoted member to turn-indicating position, a double-ended pawl pivoted to the pivoted operating member, means driven by the shaft adapted to have ratchet engagement with one end or the other of said pawl upon movement of the operating member to turn-indicating position so that upon reverse rotation of the shaft the pivoted member is rotated to off position and the pawl is restored to inoperative position.

12. In operating mechanism for direction signals the combination of a steering shaft, a pivoted operating member associated with the shaft and having an off position and a turn indicating position on either side of off position, means for actuating direction signals operated by swinging said pivoted member to turn indicating position, a double ended pawl yieldably mounted on said pivoted member, means driven by said shaft adapted to have ratchet engagement with either end of said pawl, and means operated by movement of said pivoted member to turn indicating position adapted to move said pawl to bring one end or the other into ratchet engagement with said last named means so that upon reverse rotation of the shaft the pivoted operating member is returned to off position.

HARRY C. DOANE.
ALBERT G. VOSBURGH.